US012636210B2

(12) United States Patent
Thome

(10) Patent No.: US 12,636,210 B2
(45) Date of Patent: May 26, 2026

(54) BEDSORE PREVENTION DEVICE, FURNITURE SUPPORT ELEMENT COMPRISING SUCH A DEVICE, AND METHOD OF EQUIPPING A SUPPORT ELEMENT WITH SUCH A PREVENTION DEVICE

(71) Applicants: Jean-Philippe Thome, Clermont-Ferrand (FR); Sébastien Pascal, Castillon du Gard (FR); Sophie Morice, Antibes Juan les Pins (FR)

(72) Inventor: Jean-Philippe Thome, Clermont-Ferrand (FR)

(73) Assignee: ACOUDESIGN, Clermont-Ferrand (FR)

( * ) Notice: Subject to any disclaimer, the term of this patent is extended or adjusted under 35 U.S.C. 154(b) by 19 days.

(21) Appl. No.: 18/736,714

(22) Filed: Jun. 7, 2024

(65) Prior Publication Data

US 2024/0407961 A1 Dec. 12, 2024

(51) Int. Cl.
*A61G 7/057* (2006.01)

(52) U.S. Cl.
CPC ........ *A61G 7/0573* (2013.01); *A61G 2203/10* (2013.01)

(58) Field of Classification Search
CPC .. A61G 7/057; A61G 7/0573; A61G 2203/10; A61G 7/018; A61G 7/05715; A61G 7/05707
See application file for complete search history.

(56) References Cited

U.S. PATENT DOCUMENTS

| | | | | | |
|---|---|---|---|---|---|
| 4,799,276 | A * | 1/1989 | Kadish | A61G 7/0573 5/613 |
| 4,999,861 | A * | 3/1991 | Huang | A61G 7/0573 601/51 |
| 5,237,501 | A * | 8/1993 | Gusakov | A61G 7/0573 600/587 |
| 5,625,914 | A * | 5/1997 | Schwab | A47C 23/002 5/652 |
| 5,701,621 | A * | 12/1997 | Landi | B29D 99/0089 428/116 |
| 2010/0094175 | A1* | 4/2010 | Hovorka | A61G 7/05776 600/587 |
| 2016/0081867 | A1* | 3/2016 | O'Sullivan | A47C 27/148 5/709 |
| 2020/0188222 | A1* | 6/2020 | Duncan | A61H 23/0254 |

* cited by examiner

*Primary Examiner* — Fredrick C Conley

(57) ABSTRACT

The invention concerns a bedsore prevention device (20) designed to be equipped to a support element of a piece of receiving furniture. The prevention device (20) has a bearing surface (22), intended to be flush with a surface of the support element and to be in direct or indirect contact with a body part of the subject on which the subject is likely to develop bedsores, at least three electromechanical transducers arranged to urge the bearing surface (22) to move, the at least three transducers being arranged along the bearing surface (22), a control unit (26) for the at least three transducers, the control unit (26) being configured to control the at least three transducers to urge the bearing surface in a phase-shifted manner in order to simulate a mechanical traveling wave along the bearing surface.

11 Claims, 3 Drawing Sheets

BEDSORE PREVENTION DEVICE, FURNITURE SUPPORT ELEMENT COMPRISING SUCH A DEVICE, AND METHOD OF EQUIPPING A SUPPORT ELEMENT WITH SUCH A PREVENTION DEVICE

TECHNICAL FIELD

The invention relates to the field of bedsore prevention. More specifically, the invention relates to a bedsore prevention device, furniture support element comprising such a device, and method of equipping a support element with such a prevention device.

PRIOR ART

In order to prevent bedsores, furniture such as beds designed to accommodate people at risk of developing bedsores generally have a reception zone equipped with pads made of high-density material, such as high-density polymer foam. While this solution prevents bedsores without the need for active elements, it is not perfect. Indeed, without the regular intervention of caregivers, subjects are still likely to develop bedsores despite the presence of such pads.

In order to limit the number of caregiver interventions required, dynamic anti-bedsore beds have been developed, featuring sealed cells on the mattress surface that are regularly inflated/deflated to simulate the human body's natural movements. While this type of bed is effective in preventing bedsores, they are nevertheless relatively expensive, present a risk of leakage and require a pressurized gas source, such as a compressor, which can have disadvantages in terms of noise and reliability.

Thus, there would be an interest in providing a system that allows the supply of furniture designed to accommodate susceptible subjects that does not have the above disadvantages.

DISCLOSURE OF THE INVENTION

The aim of the invention is to provide a device which can be equipped to a piece of furniture or a support element for such furniture and which makes it possible to provide effective bedsore prevention, such as that provided by dynamic anti-bedsore beds, with greater reliability.

To this end, the invention relates to a bedsore prevention device intended to equip a support element of a piece of receiving furniture, said support element being shaped to accommodate a subject likely to develop bedsores, the prevention device comprising:

- a bearing surface, designed to be flush with a surface of the support element and to be in direct or indirect contact with a body part of the subject on which the subject is likely to develop bedsores,
- at least three electromechanical transducers arranged to displace the bearing surface, the at least three transducers being arranged along the bearing surface,
- a control unit for the at least three transducers, said control unit being configured to control the at least three transducers to urge the bearing surface in a phase-shifted manner between each transducer and the transducer or transducers directly adjacent thereto, the phase shift between the at least three transducers being preferably achieved so as to simulate a mechanical traveling wave along the bearing surface.

The use of such electromechanical transducers reduces the risk of failure when using a pressurized gas source, such as a compressor. What's more, there's no risk of leakage, as is the case with the sealed cells of a dynamic anti-bedsore bed from the prior art, which would render it inoperative. Thus, the device according to the invention offers a particularly reliable bedsore prevention function. It should also be noted that, generally speaking, such a device does not require a source of pressurized gas, such as a compressor, and is therefore not subject to the disadvantages, particularly noise, associated with such a gas source.

The bearing surface may comprise a foam intended to be in direct or indirect contact with the part of the subject, the foam preferably having a density of less than 40 kg/m3, preferably 35 $Kg/m^3$ or even 30 $kg/m^3$.

This type of foam enables the mechanical urging transmitted by the electromechanical transducers to be transmitted while limiting discomfort for the subject resting on the support element.

The bearing surface may comprise a membrane comprising for each of the at least three transducers a resiliently deformable zone, each of these resiliently deformable zones being shaped to resiliently deform in order to transmit the transducer urging to the body part of the subject.

With such resiliently deformable zones, the membrane is able to present sufficient rigidity to support the subject's part, while at the same time presenting the flexibility, in these zones, necessary to transmit the mechanical urging provided by the electromechanical transducers.

The prevention device can further comprise a casing accommodating the at least three transducers and wherein the bearing surface preferably hermetically seals the casing.

With such a casing, the device can easily be installed in the support element, which only requires the creation of a cavity sized to accommodate the prevention device.

The prevention device may further comprise a power system capable of receiving contactless energy, such as an inductive charging system, said power system preferably comprising a rechargeable power source and being housed in the casing.

With such a non-contact power supply system, there is no need for a power cable, which could make it complicated to fit the support element with the prevention device.

The bearing surface can be bactericidally treated.

This treatment reduces the risk of infection on the subject's skin, which is already weakened by its long stay on the support element.

The invention further relates to a support element of a piece of receiving furniture, such as a mattress of a bed, shaped to accommodate a subject likely to develop bedsores comprising:

- a reception zone along which the subject likely to develop bedsores is intended to be installed, said reception zone having at least one location for a prevention device according to the invention,
- a bedsore prevention device according to the invention, said prevention device being arranged in the at least one location with its bearing surface flush with a surface of the reception zone.

Such a support element benefits from the advantages of the prevention device it comprises.

The piece of furniture can be a bed, the reception zone being a mattress of the bed, the reception zone being the surface of the mattress and wherein the mattress has a cavity adapted to receive said bedsore prevention device.

Such a piece of furniture and its support element particularly benefit from the advantages of the invention, since it is on this type of furniture that a subject is most likely to develop bedsores.

The support element may further comprise a first, second and third additional prevention device according to the invention and wherein:

- the prevention device equips the mattress in such a way that its bearing surface is arranged to be in direct or indirect contact with the subject's occiput,
- the first additional prevention device equips the mattress in such a way that its bearing surface is arranged to be in direct or indirect contact with the subject's sacrum,
- the second and third prevention devices are equipped to the mattress in such a way that their bearing surfaces are arranged to be in direct or indirect contact with the subject's right and left heel respectively.

Being thus equipped is particularly advantageous, since the occiput, sacrum and heels are the areas of the subject most susceptible to bedsores. In this way, the effect of the invention can be achieved without having to equip the entire surface of the support element.

The invention further relates to a method for equipping a support element of a piece of receiving furniture with a prevention device according to the invention, the equipping method comprising the following steps:

- supplying the support element of a piece of receiving furniture, the support element comprising a reception zone along which the subject likely to develop bedsores is intended to be installed, said reception zone having at least one location for a prevention device,
- supply of the prevention device,
- installing the prevention device in at least one location Such a method enables a support element to be equipped so that it can benefit from the advantages associated with the prevention device according to the invention.

BRIEF DESCRIPTION OF THE DRAWINGS

The present invention will be better understood on reading the description of exemplary embodiments, given purely by way of illustration and in no way limiting, with reference to the appended drawings wherein.

Identical, similar, or equivalent parts of the various figures bear the same numerical references, so that it is easier to browse from one figure to another.

For the sake of readability, the different parts shown in the figures are not necessarily on a uniform scale.

The various possibilities (variants and realization modes) should be understood as not being mutually exclusive and can be combined with each other.

DETAILED DESCRIPTION OF SPECIFIC EMBODIMENTS

Figure 1:
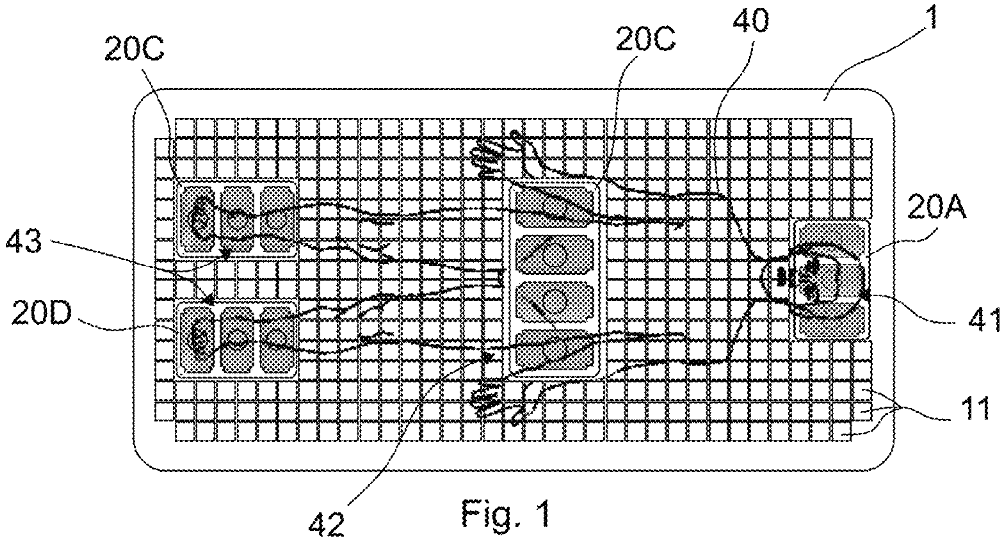
FIG. 1 illustrates an anti-bedsore mattress equipped with four bedsore prevention devices according to the invention.

FIG. 1 illustrates a mattress 1 for an anti-bedsore bed equipped with four bedsore prevention devices 20A, 20B, 20C, 20D according to the invention.

It should be noted that although in the present embodiment, the prevention device 20A, 20B, 20C, 20D according to the invention is equipped to the mattress 1 of an anti-bedsore bed, not shown, the invention is not limited to this application alone. While the invention is particularly well-suited to anti-bedsore beds, it is also aimed at other applications such as wheelchairs and their seats, where a subject is likely to develop bedsores. For example, the bedsore prevention device can easily be equipped to the seat or backrest of a wheelchair without going beyond the scope of the invention. As a result, the prevention device according to the invention can be equipped more generally to a support element, in this case the mattress 1, of a piece of receiving furniture used to accommodate subjects 40 at risk of developing bedsores.

In a preferred application of the invention as shown in FIG. 1, the support element, i.e. here the mattress 1, can be equipped with several prevention devices 20A, 20B, 20C, 20D each associated with a body part 41, 42, 43 of the subject 40 on which the subject 40 is likely to develop bedsores. In the present example, mattress 1 comprises:

- a prevention device 20A arranged to be in direct or indirect contact with the occiput 41 of the subject 40,
- a prevention device 20B arranged to be in direct or indirect contact with the sacrum 42 of the subject 40,
- two prevention devices 20C, 20D arranged to be in direct or indirect contact with the right and left heel 43 of the subject 40 respectively.

It can also be seen from FIG. 1 that, according to one possibility of the invention which is described in more detail below, the shape of each device can be adapted according to the body part 41, 42, 43 of the subject for which it is intended.

A bedsore prevention device 20 according to the present invention comprises:

- a bearing surface 22, designed to be flush with the surface of the mattress 1 and to be in direct or indirect contact with a body part 41, 42, 43 of the subject 40 on which the subject (40) is likely to develop bedsores,
- four electromechanical transducers 21A, 21B, 21C, 21D arranged to urge the bearing surface 22 to move, the four transducers 21A, 21B, 21C, 21D being arranged along the bearing surface 22,
- a control unit 26 for the four transducers 21A, 21B, 21C, 21D, said control unit 26 being configured to control the four transducers 21A, 21B, 21C, 21D to urge the bearing surface 22 in a phase-shifted manner relative to one another, the phase shift between the four transducers 21A, 21B, 21C, 21D being carried out in such a way as to simulate a mechanical traveling wave along the bearing surface,
- a power system 27 comprising a rechargeable power source and a wireless charging module,
- a casing 24 housing the transducers 21A, 21B, 21C, 21D and the control unit 26 and being hermetically sealed by the bearing surface 22, the casing being able to present an interface element 262 of the control unit 26.

Figure 2A:
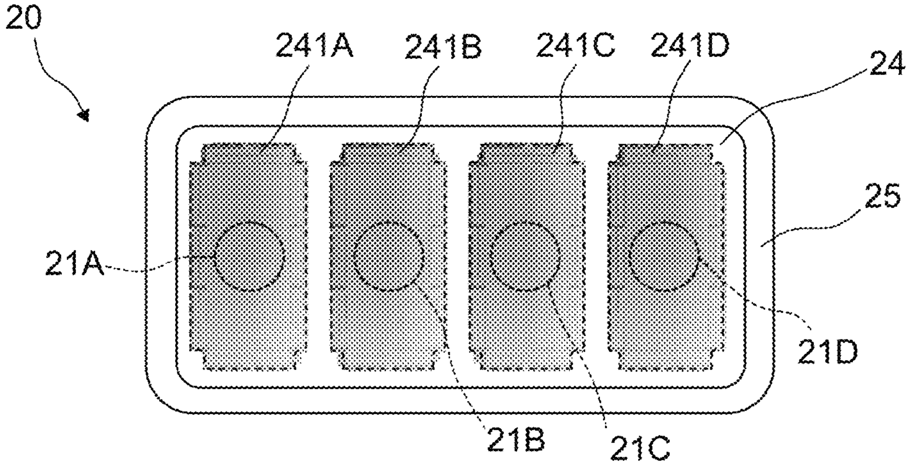
FIG. 2A shows a top view of a prevention device from which a support foam has been previously removed.
Figure 2B:
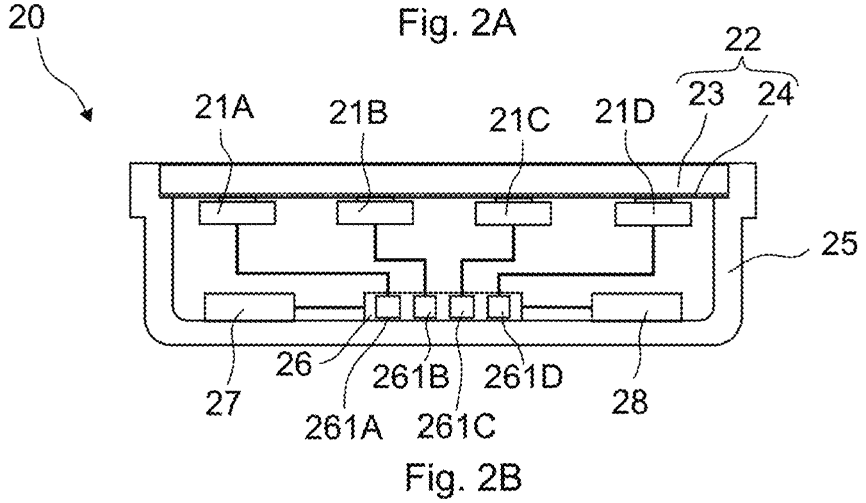
FIG. 2B shows a schematic cross-section of the prevention device shown in FIG. 2A, with the support foam in place.

As shown in FIG. 2B, the bearing surface comprises:

a foam 23 intended to be in direct or indirect contact with the body part 41, 42, 43 of the subject 40, a membrane 24 having four resiliently deformable zones 241A, 241B, 241C, 241D, each associated with a respective transducer 21A, 21B, 21C, 21D, each of these resiliently deformable zones 241A, 241B, 241C, 241D being shaped to deform resiliently in order to transmit the transducer urging 21A, 21B, 21C, 21D to the body part 41, 42, 43 of the subject 40 through the foam 23.

Of course, although in one conceivable application of the invention, the bearing surface 22 can be in direct contact with the body part 41, 42, 43 of the subject 40, in a usual application of the invention, this contact can be indirect, the mechanical traveling wave simulated by the prevention device 20 according to the invention being applied through one or more bed linens, such as a top sheet and/or fitted sheet.

According to the invention, foam 23 can have a density of less than 40 kg/m3, preferably less than 35 $kg/m^3$ or even less than 30 $kg/m^3$, for example in the range 30 to 25 $kg/m^3$. The foam 23 can be made from a polymer, preferably an elastomer, such as polyether or polyurethane.

The membrane 24 can be made of a rigid material, such as thermoplastic or metal. In order to allow resilient deformation of the membrane 24 at each of the resiliently deformable zones 241A, 241B, 241C, 241D may have a suitable shape such as the use of resilient return elements connecting the rest of the membrane 24 to said resiliently deformable zone 241A, 241B, 241C, 241D. As shown in FIG. 2A, in the present embodiment, the resilient return elements are provided by serpentine springs cut directly from the diaphragm. According to a variant not shown, the membrane 24 may comprise, at least at the periphery of the resiliently deformable zones 241A, 241B, 241C, 241D, a reduced thickness or a portion made of elastomer in order to allow such deformation of the resiliently deformable zones 241A, 241B, 241C, 241D with respect to the rest of the membrane 24.

Each of the transducers 21A, 21B, 21C, 21D is mounted on the corresponding resiliently deformable zone 241A, 241B, 241C, 241D, so that, when actuated, it urges that zone to move. The transducers 21A, 21B, 21C, 21D can be mounted on the corresponding resiliently deformable areas 241A, 241B, 241C, 241D, for example, by screwing, gluing or by making openings complementary to the transducers 21A, 21B, 21C, 21D. According to a particularly advantageous possibility not shown, and in order to allow easy maintenance of the transducers 21A, 21B, 21C, 21D, the assembly can be carried out from a base, made integral with the corresponding deformable zone, on which the transducer 21A, 21B, 21C, 21D is aimed.

According to a usual configuration, not shown, each transducer 21A, 21B, 21C, 21D comprises a fixed part, for example a transducer housing by which the transducer 21A, 21B, 21C, 21D is mounted on the resiliently deformable zone 241A, 241B, 241C, 241D; a movable part, such as a flyweight and a system for actuating the transducer 21A, 21B, 21C, 21D. The transducer actuation system 21A, 21B, 21C, 21D may comprise an exciter coil integral with either the fixed part or the movable part, and a magnetic material, such as a magnetic core, integral with the other of the fixed part and the movable part.

Note that in an optimized configuration of the invention, each transducer 21A, 21B, 21C, 21D can be a transducer as described in document WO2022008685. For more information on transducers 21A, 21B, 21C, 21D, please refer to document WO2022008685.

To power and control the transducers 21A, 21B, 21C, 21D, each transducer 21A, 21B, 21C, 21D is connected to the control unit 26.

Figure 3:
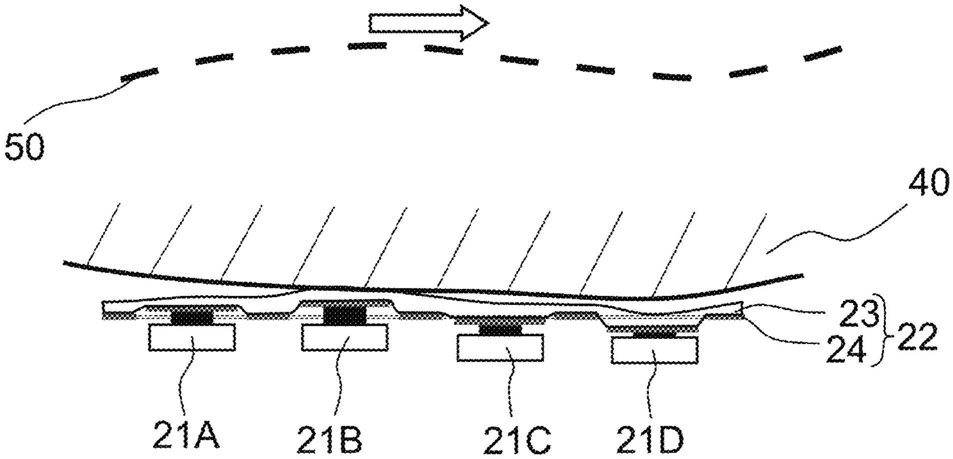

In the present embodiment, the control unit 26 comprises a respective sub-unit 261A, 261B, 261C, 261D, such as an oscillator, for each of the transducers 21A, 21B, 21C, 21D so as to control them individually. Each sub-unit 261A, 261B, 261C, 261D is thus connected to the corresponding transducer 21A, 21B, 21C, 21D. In order to simulate a traveling wave, sub-units 261A, 261B, 261C, 261D can be configured to supply transducers 21A, 21B, 21C, 21D with an alternating signal of identical frequency and with an increasing frequency offset along bearing surface 22. This type of power supply urges the bearing surface by simulating a mechanical traveling wave (similar to the effect obtained with peristaltic waves) along it, as shown in FIG. 3, to promote blood circulation in the body part 41, 42, 43 of the subject 40. Note that to enable synchronization of the sub-units 261A, 261B, 261C, 261D, the control unit may comprise a frequency generator capable of providing an alternating control signal for the sub-units 261A, 261B, 261C, 261D, the latter applying the increasing phase shift along the bearing surface.

With such an increasing phase shift, it is possible to provide the simulation of a mechanical traveling wave 50. This simulated traveling wave is particularly well-suited to promoting blood circulation in the body parts 41, 42, 43 of the subject. Note that the control unit 26 can independently adjust the frequency of the mechanical wave and the phase shift (i.e. the speed of movement of the traveling wave) according to the desired effect and various characteristics of the subject and body part of the subject being treated.

Figure 2C:
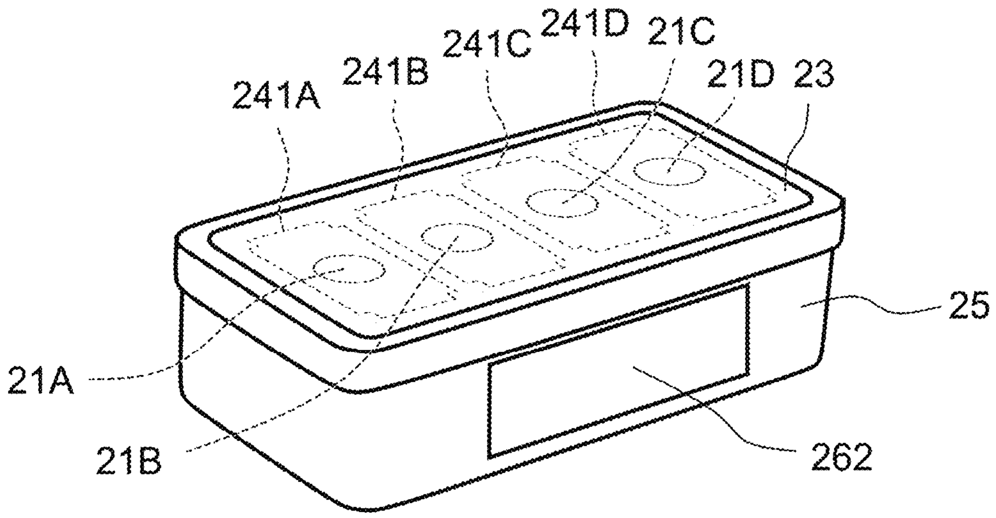
FIG. 2C shows a perspective view of the prevention device shown in FIG. 2A, FIG. 3 schematically illustrates the use of a preventive device according to the invention, in particular to enable a body part of a subject susceptible to developing bedsores to be urged in a traveling wave.

As shown in FIG. 2C, the control unit 26 may further comprise a human-machine interface 262, such as a control panel, to enable the prevention device 20 to be switched on and to enable the urging applied by the transducers 21A, 21B, 21C, 21D to the bearing surface 22 to be adjusted. Particularly advantageously, this human-machine interface can include a display showing the settings for the urging applied by transducers 21A, 21B, 21C, 21D, such as urging intensity, urging frequency, and wave propagation speed.

According to one possibility of the invention shown in FIG. 2B, as an alternative to such a human-machine interface 262, or in addition to it (as is the case in the present embodiment), the prevention device 20 may comprise a wireless communication module 28, for example a wifi and/or Bluetooth communication module (or similar wireless connection), to enable adjustment of the urging applied by the transducers 21A, 21B, 21C, 21D to the bearing surface 22.

The power supply for the control unit 26 and therefore for the transducers 21A, 21B, 21C, 21D can be provided by the integrated power supply 27. Such a power system preferably comprises a rechargeable power source, such as rechargeable batteries or supercapacitors, or even fuel cell(s). In the event that the power system 27 comprises a rechargeable power source, the power system 27 may also be capable of receiving contactless energy, such as an inductive charging module.

As shown in FIG. 2B, the transducers 21A, 21B, 21C, 21D, the control unit 26, in addition to the human-machine interface 262, the wireless communication module 28 and the power supply system 27 can be accommodated in the casing 24. The casing can be hermetically sealed by the bearing surface 22 and in particular by the diaphragm 24. To limit the risk of infection spreading to the body part 41, 42, 43 of the subject 40 that is associated with the prevention device 20, the casing and/or bearing surface 22 may feature a bactericidal treatment, such as a coating based on silver nanoparticles.

Figure 4:
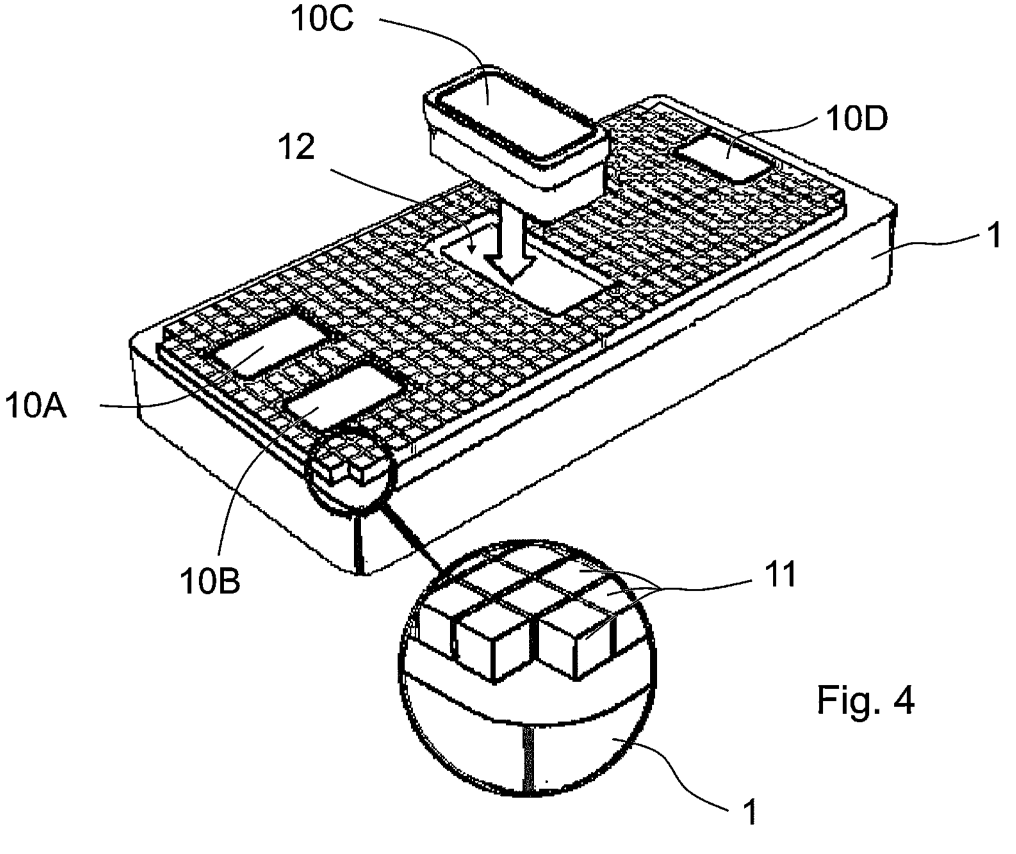
FIG. 4 shows a three-dimensional view of the mattress shown in FIG. 1 when one of the prevention devices is installed, with the other three prevention devices already installed.

As shown in FIG. 4, mattress 1 can comprise several devices, each dedicated to a respective body part 41, 42, 43 of the subject 40 on which the subject 40 is likely to develop bedsores. In order to optimize prevention, the dimensions and configuration of the prevention device can be adapted according to the body part 41, 42, 43 to be treated by said device. In the present example, prevention devices 20A, 20C, 20D dedicated to the occiput 41 and heels 43 of the subject 40 comprise three transducers 21A, 21B, 21C, 21D and have reduced dimensions, whereas the prevention device 20B dedicated to the sacrum 42 of the subject 40 comprises four transducers 21A, 21B, 21C, 21D and has larger dimensions. It should also be noted that while in the present embodiment, each prevention device 20, 20A, 20B, 20C, 20D has its transducers 21A, 21B, 21C, 21D aligned along the bearing surface in a longitudinal direction of the prevention device 20, 20A, 20B, 20C, 20D, it is also possible for the transducers 21A, 21B, 21C, 21D to be arranged differently, for example in two parallel lines.

To enable the mattress 1 to be equipped with one or more prevention devices 20A, 20B, 20C, 20D, the mattress may comprise a respective cavity 12 for the or each prevention device 20A, 20B, 20C, 20D, shaped in such a way that when the corresponding prevention device is installed in this cavity 12, its bearing surface 22 is flush with the surface of the mattress 1. Thus, when the subject 40 is installed on the mattress, the body part 41, 42, 43 of the subject for which the prevention device 20A, 20B, 20C, 20D is intended can rest on the bearing surface 22 and thus benefit from the prevention provided by the prevention device 20A, 20B, 20C, 20D.

To optimize bedsore prevention, mattress 1 can also be adapted to prevent bedsores for body parts of the subject 40 that are not covered by prevention devices 20A, 20B, 20C, 20D. To achieve this, the surface of the mattress 1, outside the areas designed to accommodate the prevention devices 20A, 20B, 20C, 20D, can be shaped in a similar way to the passive anti-bedsore mattresses of the prior art. For example, as shown in FIG. 4, and in particular in the circled close-up view shown here, the mattress may comprise studs in a high-density foam, for example in excess of 40 kg/m$^3$, or even in excess of 45 kg/m3, or of the order of 50 kg/m$^3$.

In the context of the invention, the mattress 1 can be equipped with the prevention device(s) 20A, 20B, 20C, 20D using an equipping method comprising the following steps:

- supplying the mattress, the mattress 1 comprising a reception zone along which the subject 40 likely to develop bedsores is intended to place their body, said reception zone presenting at least one location, the cavity 12 for the or each of the prevention devices 20A, 20B, 20C, 20D,
- supplying the or each prevention device 20A, 20B, 20C, 20D,
- installing the or each prevention device 20A, 20B, 20C, 20D on the mattress by being arranged in the corresponding cavity 12 with its bearing surface 22 flush with a surface of the reception zone.

The invention claimed is:

1. A bedsore prevention device (20, 20A, 20B, 20C, 20D) intended to equip a support element (1) of a piece of receiving furniture, said support element (1) being shaped to receive a subject (40) likely to develop bedsores, the prevention device (20, 20A, 20B, 20C, 20D) comprising:

- a bearing surface (22), designed to be flush with the surface of the support element (1) and to be in direct or indirect contact with a body part (41, 42, 43) of the subject (40) on which the subject (40) is likely to develop bedsores,
- at least three electromechanical transducers (21A, 21B, 21C, 21D) arranged to urge the bearing surface (22) to move, the at least three transducers (21A, 21B, 21C, 21D) being arranged along the bearing surface (22), wherein each transducer 21A, 21B, 21C, 21D of the at least three transducers is mounted on a corresponding resiliently deformable zone 241A, 241B, 241C, 241D of the bearing surface, so that, when actuated, the transducer urges the corresponding deformable zone to move,
- a control unit (26) for the at least three transducers (21A, 21B, 21C, 21D), said control unit (26) being configured to control the at least three transducers (21A, 21B, 21C, 21D) to urge the bearing surface in a phase-shifted manner between each said transducer and a transducer or transducers of the at least three transducers directly adjacent thereto, the phase shift between the at least three transducers (21A, 21B, 21C, 21D) being achieved so as to simulate a traveling wave, wherein sub-units 261A, 261B, 261C, 261D of the control unit are configured to supply transducers 21A, 21B, 21C, 21D with an alternating signal of identical frequency and with an increasing frequency offset along the bearing surface.

2. The prevention device (20, 20A, 20B, 20C, 20D) according to claim 1, wherein the bearing surface further comprises a foam intended to be in direct or indirect contact with the body part (41, 42, 43) of the subject (40), the foam preferably having a density of less than 40 Kg/m$^3$.

3. The prevention device (20, 20A, 20B, 20C, 20D) according to claim 2, wherein the bearing surface comprises a foam intended to be in direct or indirect contact with the body part (41, 42, 43) of the subject (40), the foam having a density of 35 Kg/m$^3$ or even 30 Kg/m3.

4. The prevention device (20, 20A, 20B, 20C, 20D) according to claim 1, further comprising a casing (24) accommodating the at least three transducers (21A, 21B, 21C, 21D) and wherein the bearing surface seals the casing (24).

5. The prevention device (20, 20A, 20B, 20C, 20D) according to claim 4 further comprising a power supply system (27) capable of receiving contactless energy, such as an inductive charging system, said power supply system (27) comprising a rechargeable power source and being housed in the casing.

6. The prevention device (20, 20A, 20B, 20C, 20D) according to claim 1, wherein the bearing surface has a bactericidal treatment.

7. The prevention device (20, 20A, 20B, 20C, 20D) according to claim 1, wherein the bearing surface (22) comprises a membrane (24) comprising for each of the at least three transducers (21A, 21B, 21C, 21D) a resiliently deformable zone (241A, 241B, 241C, 241D), each of these resiliently deformable zones (241A, 241B, 241C, 241D) being shaped to deform resiliently in order to transmit the transducer urging (21A, 21B, 21C, 21D) to the body part (41, 42, 43) of the subject (40).

8. A support element (1) of a piece of receiving furniture, such as a bed mattress, shaped to receive a subject likely to develop bedsores, comprising:

a reception zone along which the subject likely to develop bedsores is intended to be installed, said reception zone having at least one location for a prevention device according to claim 1, a bedsore prevention device wherein, said prevention device (20) being arranged in the at least one location with its bearing surface flush with a surface of the reception zone.

9. The support element (1) according to claim 8, wherein the piece of furniture is a bed, the support element (1) being a mattress of the bed, the reception zone being the surface of the mattress and wherein the mattress has a cavity (12) adapted to receive said bedsore prevention device (20).

10. The support element (1) according to claim 9 further comprising a first, second and third additional prevention device (20A, 20B, 20C) wherein:

the prevention device (20A) equips the mattress in such a way that its bearing surface is arranged to be in direct or indirect contact with the subject's (40) occiput (41), the first additional prevention device (20B) equips the mattress in such a way that its bearing surface is arranged to be in direct or indirect contact with the subject's (40) sacrum (42), the second and third prevention devices (20C, 20D) are equipped to the mattress in such a way that their bearing surfaces are arranged to be in direct or indirect contact with the subject's (40) right and left heel (43) respectively.

11. A method for equipping a support element (1) of a piece of receiving furniture with a prevention device (20, 20A, 20B, 20C, 20D) according to claim 1, the equipping method comprising the following steps:

supplying the support element (1) of a piece of receiving furniture, the support element comprising a reception zone along which the subject likely to develop bedsores is intended to be installed, said reception zone having at least one location for a prevention device (20, 20A, 20B, 20C, 20D), supplying the prevention device (20, 20A, 20B, 20C, 20D), installing the prevention device (20, 20A, 20B, 20C, 20D) by being arranged in the at least one location with its bearing surface flush with a surface of the reception zone.

* * * * *